United States Patent
Price et al.

(10) Patent No.: US 9,805,547 B2
(45) Date of Patent: Oct. 31, 2017

(54) AVATAR AS SECURITY MEASURE FOR MOBILE DEVICE USE WITH ELECTRONIC GAMING MACHINE

(71) Applicant: IGT, Las Vegas, NV (US)

(72) Inventors: Derrick Price, Las Vegas, NV (US); Dwayne R. Nelson, Las Vegas, NV (US); Dennis Thomas Kleppen, Henderson, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 15/259,908

(22) Filed: Sep. 8, 2016

(65) Prior Publication Data
US 2016/0379442 A1    Dec. 29, 2016

Related U.S. Application Data

(63) Continuation of application No. 14/950,854, filed on Nov. 24, 2015, now Pat. No. 9,443,384, which is a
(Continued)

(51) Int. Cl.
*G06F 21/36* (2013.01)
*G07F 17/32* (2006.01)
(Continued)

(52) U.S. Cl.
CPC .......... *G07F 17/3241* (2013.01); *A63F 13/71* (2014.09); *A63F 13/792* (2014.09); *G06F 21/30* (2013.01); *G06F 21/31* (2013.01); *G06F 21/34* (2013.01); *G06F 21/35* (2013.01); *G06F 21/36* (2013.01); *G06Q 20/4014* (2013.01); *G07F 17/3209* (2013.01); *G07F 17/3211* (2013.01); *G07F 17/3218* (2013.01); *G07F 17/3225* (2013.01); *G07F 17/3237* (2013.01); *G07F 17/3244* (2013.01)

(58) Field of Classification Search
CPC ............. G07F 17/3218; G07F 17/3225; G07F 17/3241; G06F 21/34–21/36; G06F 21/44; G06F 21/345
See application file for complete search history.

(56) References Cited

U.S. PATENT DOCUMENTS

| | | |
|---|---|---|
| 4,799,683 A | 1/1989 | Bruner, Jr. |
| 5,011,149 A | 4/1991 | Purnell |
| (Continued) | | |

OTHER PUBLICATIONS

U.S. Appl. No. 13/156,903, filed Jun. 9, 2011.
(Continued)

*Primary Examiner* — Steven J Hylinski
(74) *Attorney, Agent, or Firm* — Neal, Gerber & Eisenberg LLP

(57) ABSTRACT

A gaming system compatible with patron-controlled portable electronic devices, such as smart phones or tablet computers, is described. The gaming system is configured to establish a secure communication session between an electronic gaming machine and a portable electronic device. The system can confirm that a communication session is secure by displaying pre-selected content unique to the portable electronic device. The content can be continuously displayed on the EGM during the active communication session to indicate that the session is secure.

27 Claims, 7 Drawing Sheets

Related U.S. Application Data continuation of application No. 14/704,465, filed on May 5, 2015, now Pat. No. 9,218,715, which is a continuation of application No. 13/531,441, filed on Jun. 22, 2012, now Pat. No. 9,039,523.

(51) Int. Cl.

| | | |
|---|---|---|
| A63F 13/71 | (2014.01) | |
| G06F 21/30 | (2013.01) | |
| G06F 21/31 | (2013.01) | |
| G06F 21/34 | (2013.01) | |
| G06F 21/35 | (2013.01) | |
| A63F 13/792 | (2014.01) | |
| G06Q 20/40 | (2012.01) | |

(56) References Cited

U.S. PATENT DOCUMENTS

| | | | |
|---|---|---|---|
| 5,096,195 | A | 3/1992 | Gimmon |
| 5,168,969 | A | 12/1992 | Mayhew |
| 5,232,191 | A | 8/1993 | Infanti |
| 5,240,249 | A | 8/1993 | Czarnecki et al. |
| 5,242,163 | A | 9/1993 | Fulton |
| 5,429,361 | A | 7/1995 | Raven et al. |
| 5,429,363 | A | 7/1995 | Hayashi |
| 5,489,010 | A | 2/1996 | Rogers |
| 5,499,294 | A * | 3/1996 | Friedman ............... G07D 7/002 348/207.99 |
| 5,579,002 | A | 11/1996 | Iggulden et al. |
| 5,762,617 | A | 6/1998 | Infanti |
| 5,770,533 | A | 6/1998 | Franchi |
| 5,913,487 | A | 6/1999 | Leatherman |
| 5,999,808 | A | 12/1999 | LaDue |
| 6,091,066 | A | 7/2000 | Sugihara |
| 6,120,025 | A | 9/2000 | Hughes |
| 6,270,410 | B1 | 8/2001 | DeMar et al. |
| 6,293,485 | B1 | 9/2001 | Hollowed |
| 6,422,670 | B1 | 7/2002 | Hedrick et al. |
| 6,454,649 | B1 | 9/2002 | Mattice et al. |
| D474,183 | S | 5/2003 | Mesa |
| 6,638,166 | B2 | 10/2003 | Hedrick et al. |
| 6,676,522 | B2 | 1/2004 | Rowe et al. |
| 6,702,672 | B1 | 3/2004 | Angell et al. |
| 6,846,238 | B2 | 1/2005 | Wells |
| 6,971,956 | B2 | 12/2005 | Rowe et al. |
| 7,611,409 | B2 | 11/2009 | Muir et al. |
| 7,699,703 | B2 | 4/2010 | Muir et al. |
| 7,850,528 | B2 | 12/2010 | Wells |
| 7,954,137 | B2 * | 5/2011 | Schuba ............... G06F 21/36 709/229 |
| 8,109,821 | B2 | 2/2012 | Kovacs et al. |
| 8,142,281 | B2 | 3/2012 | Robins et al. |
| 8,241,127 | B2 | 8/2012 | Kovacs |
| 8,496,530 | B2 | 7/2013 | Dean |
| 8,621,242 | B2 | 12/2013 | Brown et al. |
| 9,100,822 | B2 * | 8/2015 | Doss ............... H04W 12/04 |
| 9,450,930 | B2 * | 9/2016 | Foulds ............... H04L 63/08 |
| 2002/0123381 | A1 | 9/2002 | Akeripa |
| 2002/0167486 | A1 | 11/2002 | Tan et al. |
| 2003/0045354 | A1 | 3/2003 | Giobbi |
| 2003/0050117 | A1 | 3/2003 | Silva et al. |
| 2003/0064805 | A1 | 4/2003 | Wells |
| 2003/0119543 | A1 | 6/2003 | Kfoury et al. |
| 2003/0216174 | A1 | 11/2003 | Gauselmann |
| 2004/0023709 | A1 | 2/2004 | Beaulieu et al. |
| 2004/0038725 | A1 | 2/2004 | Kaminkow |
| 2004/0040617 | A1 | 3/2004 | Dietrich |
| 2004/0118669 | A1 | 6/2004 | Mou |
| 2004/0140617 | A1 | 7/2004 | Cordell |
| 2006/0046849 | A1 | 3/2006 | Kovacs |
| 2006/0149846 | A1 | 7/2006 | Schuba |
| 2006/0189382 | A1 | 8/2006 | Muir et al. |
| 2007/0202941 | A1 | 8/2007 | Miltenberger et al. |
| 2008/0076572 | A1 | 3/2008 | Nguyen et al. |
| 2008/0201578 | A1 | 8/2008 | Drake |
| 2008/0229109 | A1 * | 9/2008 | Gantman ............... G06F 21/33 713/176 |
| 2009/0098943 | A1 | 4/2009 | Weber et al. |
| 2009/0228707 | A1 * | 9/2009 | Linsky ............... G06F 21/31 713/171 |
| 2010/0017602 | A1 * | 1/2010 | Bussard ............... H04L 9/0844 713/168 |
| 2010/0169514 | A1 | 7/2010 | Noguchi et al. |
| 2011/0093723 | A1 | 4/2011 | Brown et al. |
| 2011/0183612 | A1 * | 7/2011 | Bregman-Amitai .. H04W 12/04 455/41.2 |
| 2011/0275428 | A1 | 11/2011 | Forman et al. |
| 2012/0198531 | A1 * | 8/2012 | Ort ............... H04W 12/08 726/7 |
| 2013/0017884 | A1 | 1/2013 | Price et al. |
| 2013/0023339 | A1 | 1/2013 | Davis et al. |
| 2013/0137509 | A1 * | 5/2013 | Weber ............... G07F 17/3209 463/29 |
| 2013/0237155 | A1 * | 9/2013 | Kim ............... H04W 12/06 455/41.2 |

OTHER PUBLICATIONS

U.S. Appl. No. 13/157,166, filed Jun. 9, 2011.
U.S. Appl. No. 13/217,105, filed Aug. 24, 2011.
U.S. Appl. No. 13/217,110, filed Aug. 24, 2011.
U.S. Appl. No. 13/220,430, filed Aug. 29, 2011.
U.S. Appl. No. 13/333,659, filed Dec. 21, 2011.
U.S. Appl. No. 13/333,669, filed Dec. 21, 2011.
U.S. Appl. No. 13/333,679, filed Dec. 21, 2011.
U.S. Appl. No. 13/299,199, filed Nov. 17, 2011.
U.S. Appl. No. 13/333,623, filed Dec. 21, 2011.
U.S. Appl. No. 13/229,494, filed Sep. 9, 2011.
U.S. Appl. No. 13/229,507, filed Sep. 9, 2011.
U.S. Appl. No. 13/229,536, filed Sep. 9, 2011.
U.S. Appl. No. 13/231,275, filed Sep. 13, 2011.
U.S. Appl. No. 13/308,213, filed Nov. 30, 2011.
U.S. Appl. No. 13/308,160, filed Nov. 30, 2011.
U.S. Appl. No. 13/335,652, filed Dec. 22, 2011.
U.S. Appl. No. 13/306,911, filed Nov. 29, 2011.
U.S. Appl. No. 13/361,601, filed Jan. 30, 2012.
U.S. Appl. No. 13/478,551, filed May 23, 2012.
U.S. Appl. No. 13/335,613, filed Dec. 22, 2011.
U.S. Appl. No. 13/426,479, filed Mar. 21, 2011.
U.S. Appl. No. 13/433,879, filed May 8, 2012.
U.S. Appl. No. 13/495,947, filed Jun. 13, 2012.
U.S. Appl. No. 13/529,665, filed Jun. 21, 2012.

* cited by examiner

AVATAR AS SECURITY MEASURE FOR MOBILE DEVICE USE WITH ELECTRONIC GAMING MACHINE

PRIORITY

This application is a continuation of, and claims priority and benefit of patent application Ser. No. 14/950,854, filed on Nov. 24, 2015, which is a continuation of, and claims priority and benefit of U.S. patent application Ser. No. 14/704,465, filed on May 5, 2015, now U.S. Pat. No. 9,218,715, and which is a continuation of, and claims priority and benefit of U.S. patent application Ser. No. 13/531,441, filed on Jun. 22, 2012, now U.S. Pat. No. 9,039,523, the entire contents of which are incorporated herein by reference.

FIELD

The described embodiments relate generally to gaming systems, such as gaming systems deployed in a casino enterprise. More particularly, apparatus and method for a secure connection between a portable electronic device and an electronic gaming machine are described.

BACKGROUND

Developing and maintaining a loyal customer base is a critical component of operating a successful casino enterprise. To develop a loyal customer base, casino enterprises attempt to generate interactions with their patrons that provide a unique and personalized game playing experience. As an example, casino enterprises offer patrons the opportunity to participate in a loyalty program. Via the loyalty program, patrons are offered various promotions and free items that encourage the patron to return to the casino.

In the loyalty program, the promotions can be tailored to a particular patron's preferences. As an example, if preferred, a patron can choose to receive promotional credits for game play on an electronic gaming machine (EGM) and information regarding this preference can be stored to an account associated with the loyalty program. In general, information regarding the patron's preferences for promotions as well as other activities within the casino enterprise, such as food, drink and room preferences, can be stored to the patron's account associated with the loyalty program. The patron information stored in the account can be used to personalize the service and the game playing experience provided by the casino enterprise.

An ever increasing portion of patrons who visit casinos are regularly carrying portable electronic devices, such as smart phones, laptops, netbooks and tablet computers capable of wireless communications, on their person. The portable electronic devices provide 1) a means of communication allowing the patron to communicate with other individuals within or outside of a casino via a number of different communication modes, 2) a source of news and information, 3) a portal to the patron's on-line activities, such as social media applications, 4) support for entertainment features, such as audio/video playback and gaming applications, 5) a repository for personal information, such as financial information that enables financial transactions in mobile wallet applications and 6) a means of capturing information, such as video images and audio recordings. Thus, portable electronic devices, such as smart phones, are becoming essential tools and, in some instances, the primary electronic interface for many individuals.

The popularity of portable electronic devices allows for the possibility of utilizing their capabilities to further personalize and enhance the gaming experience in a casino gaming environment. In view of the above, methods and apparatus are desired that allow for secure connections between an EGM and a portable electronic devices within a casino environment.

SUMMARY

A gaming system compatible with patron-controlled portable electronic devices, such as smart phones, laptops, netbooks and tablet computers, is described. The gaming system can include gaming devices, such as electronic gaming machines and system servers. The gaming system can be configured to determine whether an active communication session with a portable electronic device is secure.

According to one aspect, a method in a gaming system including a server, processor, memory and a network interface is described. A request for initiating a communication session between a portable electronic device in a wager-based gaming environment and an electronic gaming machine is received. Pre-selected content from the portable electronic device for confirming security of communication session is received at the electronic gaming machine. The pre-selected content is displayed on a display of the electronic gaming machine.

According to another aspect, a method in a gaming system including a server, processor, memory and a network interface is described. A communication session between a portable electronic device and an electronic gaming machine in a gaming environment is detected via the network interface. Pre-selected content transmitted by the portable electronic device is received at the electronic gaming machine. The pre-selected content is for confirming security of the communication session. It is determined whether the pre-selected content is appropriate in the gaming environment.

According to yet another aspect, a method in a gaming system including a server, processor, memory and a network interface is described. A request from a portable electronic device is received at an electronic gaming machine to establish a wireless communication link between the portable electronic device and the electronic gaming machine. A request is then made for pre-selected content from the portable electronic device for confirming security of the communication link. The pre-selected content is received at the electronic gaming machine from the portable electronic device, and a secure wireless communication session between the electronic gaming machine and the portable electronic device is established.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1A:
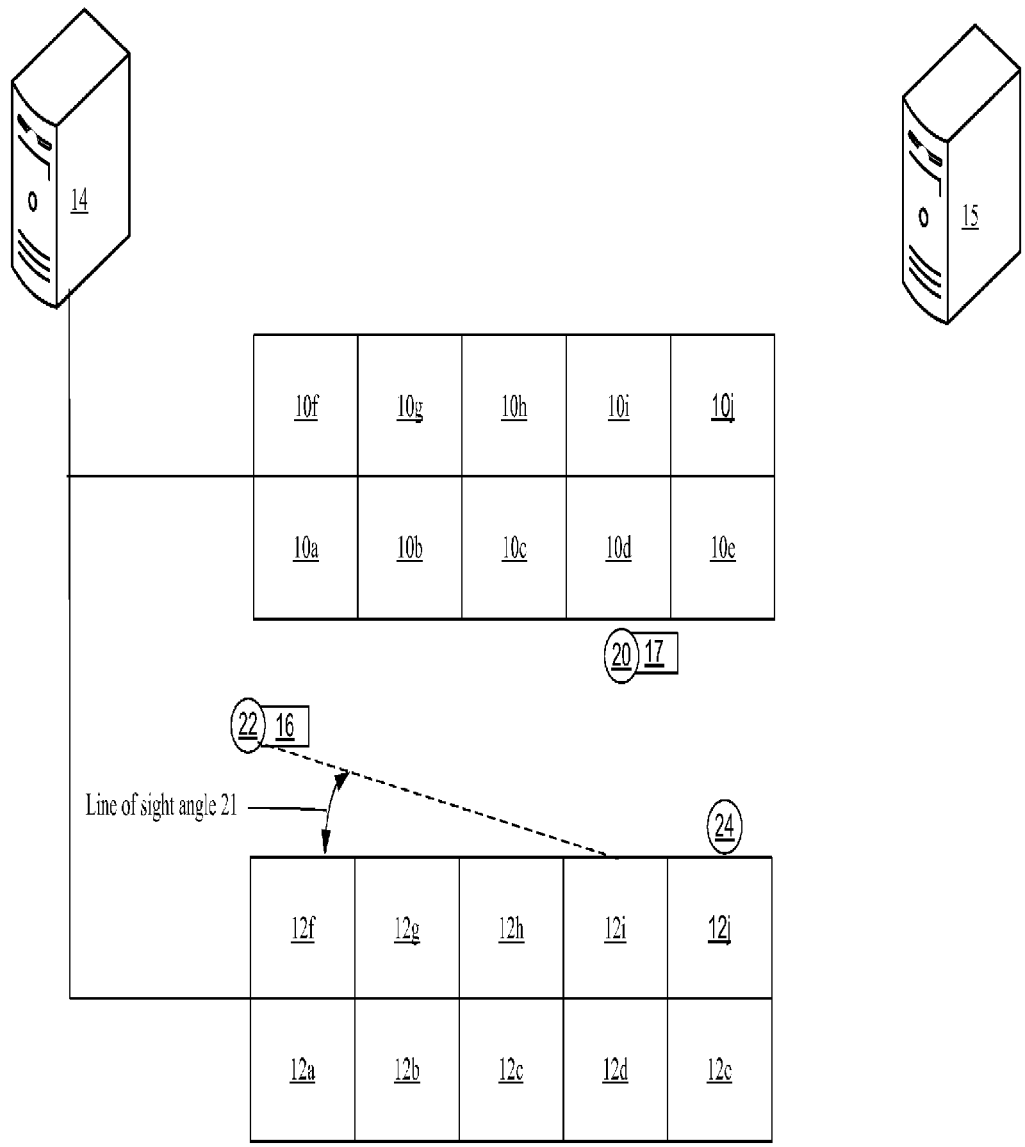
FIGS. 1A and 1B show a block diagram of electronic gaming machines and portable electronic devices in accordance with the described embodiments.
Figure 1B:
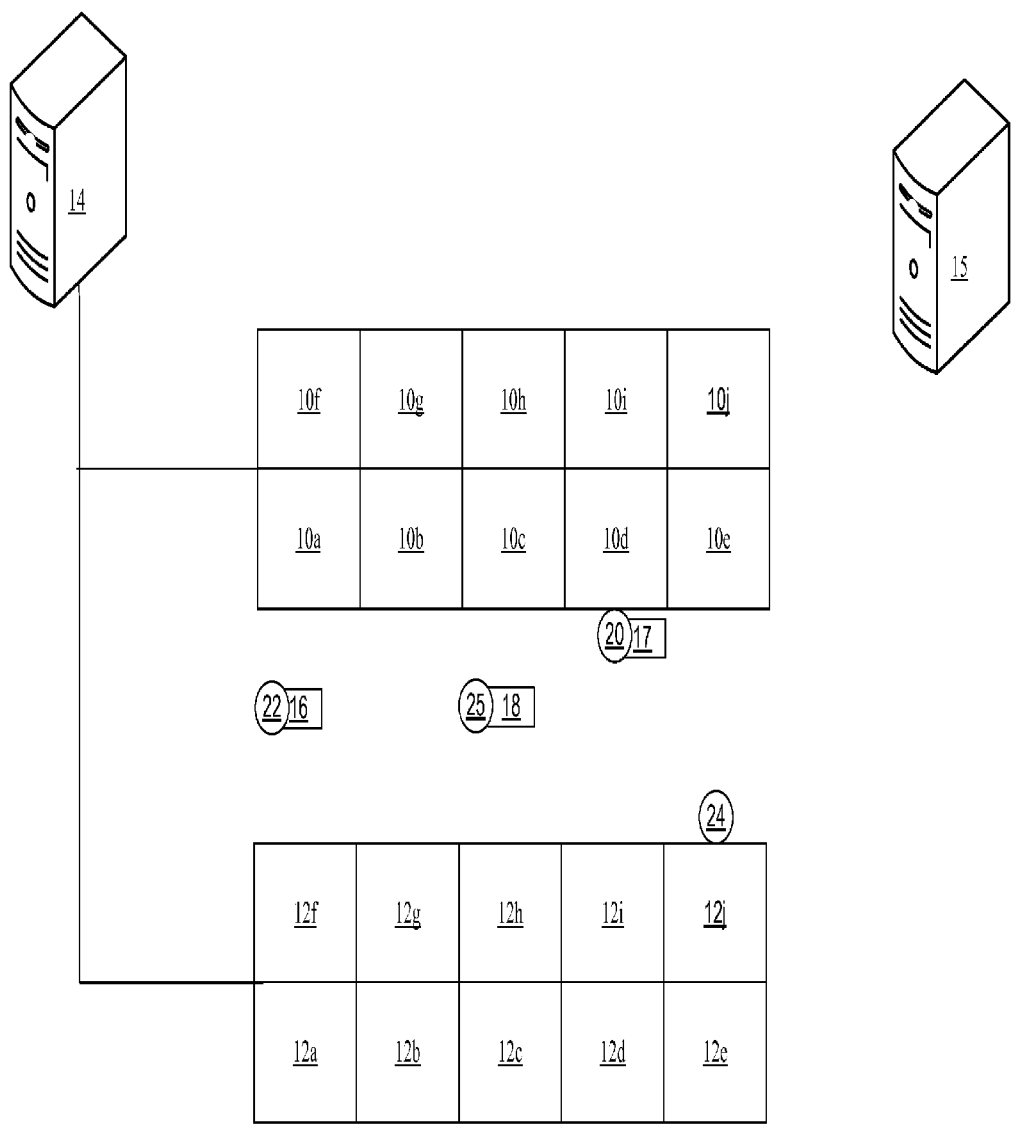

A gaming system compatible with portable electronic devices controlled by users of the gaming system is described. The gaming system can include a number of features that determine whether to wirelessly connect or disconnect portable electronic devices, such as, for example, smart phones, laptops, netbooks and tablet computers, to an EGM in a casino gaming environment. In particular embodiments, users are to confirm whether connections between their portable electronic devices and EGMs are secure based upon the display on the EGM of content that is pre-selected by the user. In FIGS. 1A and 1B, interactions involving wireless communications and details of a wireless infrastructure for supporting these communications are shown.

In an embodiment shown in FIG. 1A, two banks of EGMs are shown. Ten EGMs, 10a-10f, are in the first bank and ten EGMs, 12a-12f, are in the second bank. The EGMs can be in wireless or wired communication with one or more remote servers, such as server 14 or server 15. A number of patrons can be located proximate to the EGMs where some of the patrons near the EGMs can be engaging in a game play session. For instance, patron 20 is located near EGM 10d and can be engaging in a game play session on the EGM 10d and patron 24 is located near EGM 10d and can be engaging in a game play session on EGM 12j. Other patrons, such as 22, can be walking or standing near the EGMs but not currently engaged in game play. The patrons not engaged in game play, like patrons engaged in game play, can be carrying portable electronic devices, such as a smart phone, a netbook or a tablet computer. For instance, patron 22 is carrying a portable electronic device 16. Patrons who are engaged in game play can also be carrying a portable electronic device 17. For example, patron 20 carrying portable electronic device 17 can already be engaged in game play.

In a casino, more than one portable electronic device 16, 17 may be in proximity to an EGM, as shown in FIG. 1A. In a busy casino, numerous such portable devices 16, 17 may be in proximity to the EGM. A patron at an EGM would want a secure connection with the EGM. The patron would want to make sure the EGM is securely connected with only his or her portable electronic device. In such cases, there can be an exchange between the EGM and the portable electronic device of unique content that can be specified by the owner of the portable electronic device ahead of time. For example, the presence of the pre-selected content on a display of the EGM can let the patron know that the EGM is in fact connected to his or her portable electronic device.

For example, a player of an EGM is a person 20 typically sitting in front of the EGM 10d and the player's portable electronic device 17 is the one that should be wirelessly connected with the EGM 10d as opposed to the portable device 16 belonging to a person, who is not engaged in a game play session, sitting at a bar near the EGM or walking near the EGM, such as patrons 22, 25 shown in FIG. 1A. The person 20 sitting directly in front of the EGM 10d would probably like to know that his or her portable device 10d has a secure connection to the EGM 10d, and that the EGM 10d is connected only to his or her device 102 and not connected with a portable device 16, 18 belonging to one of the other patrons 22, 25 in the aisle.

In a typical casino, there are many EGMs in close proximity to one another, as shown in FIG. 1A. If several of the EGMs in a particular location are being played by people with such portable devices 17, several potential portable devices 17 may be within range of a particular EGM. An EGM will not only detect wireless signals from a portable device 17 directly in front of it, but also wireless signals from portable devices 16, 18 belonging to people who are passing by or sitting nearby and not engaged in a game play session on the EGM.

In an embodiment, a portable device can have an application, which runs on the portable device, that provides unique content to the EGM that a patron can specify beforehand. According to this embodiment, the pre-selected unique content can appear on the EGM 10d and let the patron 20 know that the EGM 10d is connected to his or her portable electronic device 17. The pre-selected unique content can be displayed on the EGM 10d to the patron 20 during the time his or her portable device 17 is connected to the EGM 10d and if the EGM 10d establishes a connection with another portable electronic device, the displayed content can change and the patron 20 would be aware that the EGM 10d is not longer connected to his or her device 17.

In an embodiment, the unique content can be an avatar that is chosen from a list of pictures on the portable device 17. As an example, the portable device 17 could offer the patron 20 the list and the patron 20 could choose a picture of, for example, a brown dog. When the patron 20 establishes a communication session with the EGM 10d, the picture of the brown dog can be shown on a display of the EGM 10d. Alternatively, the secure content could be selected from the patron's own photos on his or her portable device 17. A patron's own photos would be more unique and likely eliminate the possibility that two players in the same area have the same pre-selected avatar. In other embodiments, the secure content could be a movie, animation, sound, or even a text phrase. For example, a patron 20 might choose the name of his or her favorite author and that name would appear on the EGM 10d display.

The application running on the portable device or EGM or a server can process the pre-selected content and determine whether the content is appropriate in a casino. For example, if the pre-selected content contains a pornographic image or video or profanity, the application can notify the patron that the content is inappropriate and ask the patron to select new content. Alternatively, if a patron tries to establish a connection with an EGM using a portable device and a pre-selected avatar that the EGM or server determines is inappropriate, the EGM can notify the patron that the pre-selected content is inappropriate and ask the patron to select new content if he or she wants to establish a secure connection with the EGM.

Figure 2:
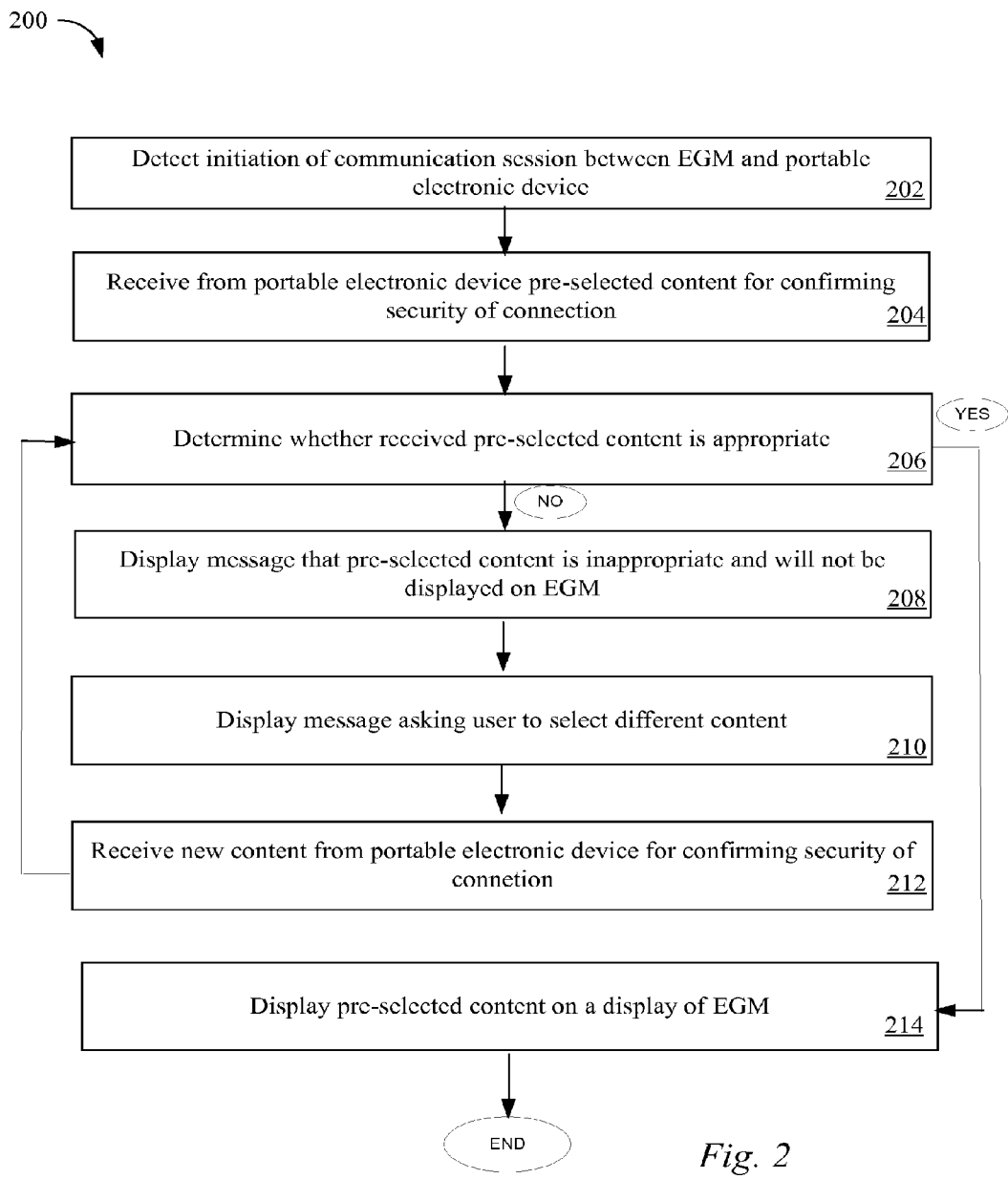
FIG. 2 is a flow diagram of an embodiment of a method of determining whether a communication session is secure and whether the pre-selected content is appropriate for a casino environment.

FIG. 2 shows a method 200 of determining whether a communication session is secure and whether the pre-selected content is appropriate for a casino environment. As described above, one or more of the steps in the method can also be performed by an application executing on an EGM or on a portable electronic device. In 202, a communication session between an EGM and a portable electronic device can be detected. Pre-selected content is then received from the portable electronic device for confirming the security of the connection between the EGM and the portable electronic device in 204. In 206, a determination can be made whether the pre-selected content is appropriate for a casino environment. If it is determined that the pre-selected content is appropriate, then the method 200 moves on to 214 where the pre-selected content is displayed on an EGM display.

If it is determined that the pre-selected content is inappropriate for a casino environment, the method 200 continues to 208 where a message is displayed on the portable electronic device and/or the EGM that the pre-selected content is inappropriate. The message can also inform the user that the pre-selected content will not be displayed on the EGM. In 210, a message is displayed on the portable electronic device and/or the EGM asking the user to select different content. In 212, newly selected content is received from the portable electronic device for confirming the security of the connection between the EGM and the portable electronic device. The method them moves to 206 where it can be determined whether the newly selected content is appropriate. These steps 206-212 will be repeated until it is determined that the content is appropriate. If it is determined that the content is appropriate, the method moves to 214 where the content is displayed on an EGM display.

According to an embodiment, the secure content can appear on the EGM 10d display as a banner. In other embodiments, the secure content can appear on the EGM 10d as a still image. The secure content can also be displayed in a service window or other window outside the game window. Alternatively, the secure content can be displayed on the player tracking device screen.

The secure content can be displayed on the EGM either temporarily or continuously during a game play session. For example, the secure content might only be shown briefly after a change in connection state. In this embodiment, the patron would first connect with his or her portable device with the EGM and then see his or her pre-selected avatar for a few seconds before it disappears. If another patron connects to the same EGM, the other patron's pre-selected avatar, which would be different from the first patron's pre-selected avatar, would appear briefly on the EGM display and the first patron would know that another patron has established a connection with the same EGM.

The secure content can also be real time information from the portable device. The secure content could be real time video or real time motion information. In this manner, the patron would see the video or motion information from the portable device on the EGM display. As an example of real time motion information, a patron can wave his or her portable device in front of an EGM and the EGM can provide real time feedback. For example, the EGM display might flash or jiggle or provide some other type of indication that the EGM has recognized the portable device as the patron waves the portable device in front of the EGM.

Figure 3:
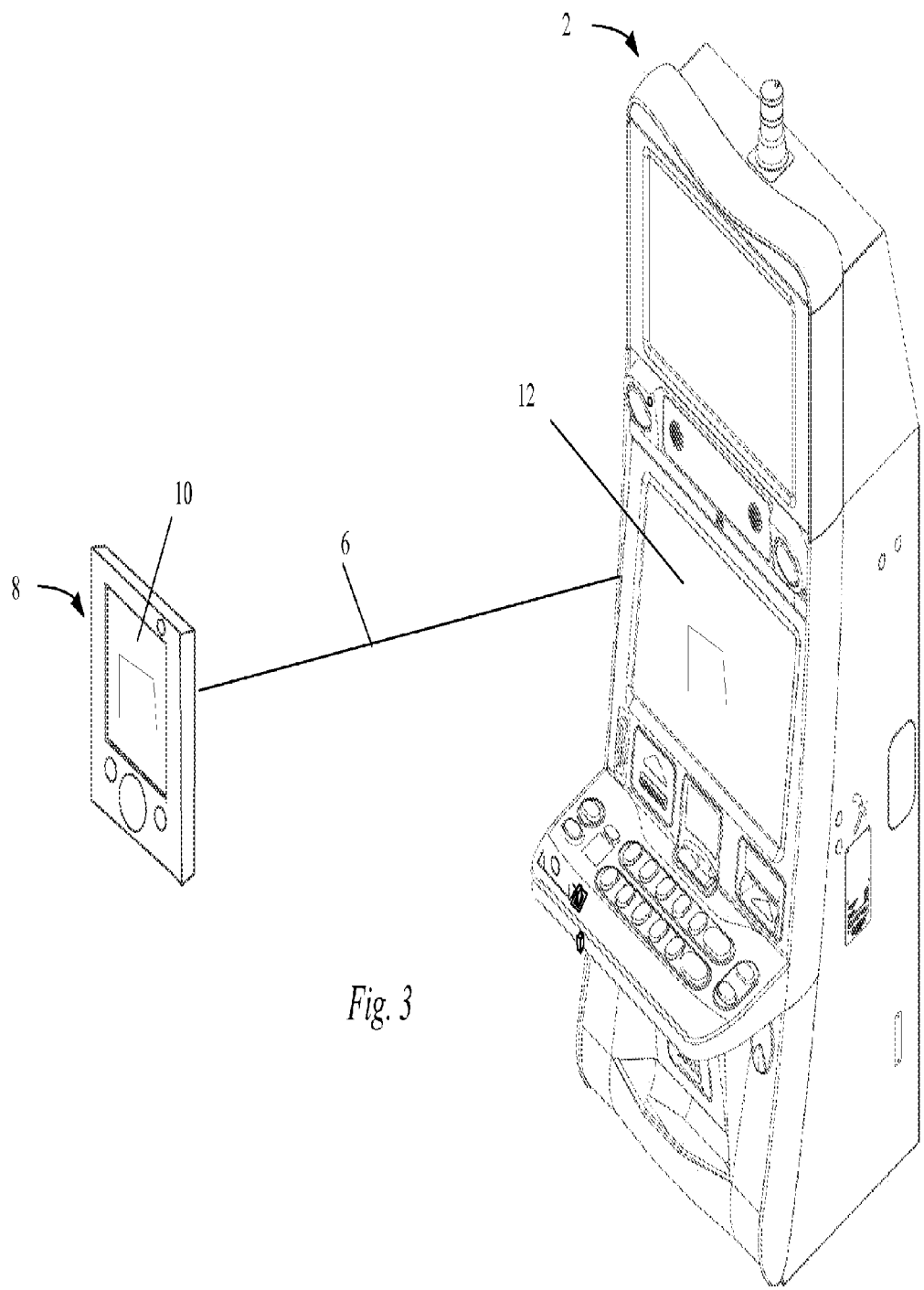
FIG. 3 illustrates an embodiment in which a portable electronic device is in communication with an EGM and information can be sent from the portable device to the EGM in the form of real time touch information.

According to an embodiment illustrated in FIG. 3, the information could be real time touch information. In this embodiment, a portable device 8 and EGM 2 are coupled via a communication link 6, which can be wired or wireless. For example, if the patron used the mobile device 8 to draw a square on the mobile screen 10, the patron would see the same square and motion of making the square on the display 1 of the EGM 2. In an embodiment, the secure content can be displayed and then scaled down and placed into a system tray or icon. The patron can also have a button or other interface to display the secure content so that the patron can review it and make sure it is as expected.

According to an embodiment, the application running on the portable device can cycle through a list of content. In this embodiment, the content can change each time the patron connects or periodically over time. The content can change sequentially such that the patron knows the pattern. For example, the content can change according to the following order: photo of wife, photo of daughter, photo of son, photo of dog, and repeat. The content can also be randomly chosen from the list of possible content.

According to an embodiment, the secure content can be transmitted from a portable electronic device to the EGM. Information about the secure content can be transferred to the EGM and the EGM or gaming system can look up that information. For example, the patron chooses the picture of the brown dog, the portable device sends the information regarding the choice to the EGM and the EGM can look up the picture independently of the mobile device.

Bluetooth™ and Wi-Fi™ can be used to wirelessly pair a portable device with an EGM. Near field communication (NFC) pairing can also be used to wirelessly connect an EGM with a portable device for facilitating transactions, data exchange, and other wireless communications between the two devices when they are in close proximity to each other, usually about a few centimeters. NFC chips embedded in a portable electronic device can be used to store information, such as credit card data, belonging to the owner of the portable electronic device. When the patron waves or holds his or her portable electronic device near the EGM, or the portable electronic device is simply near the EGM, the portable electronic device can send such information to the EGM so that the EGM can identify the patron.

Once the portable device is paired to the EGM and there is a secure connection between the EGM and the portable device, payment information, such as an electronic voucher or electronic fund transfer, can be provided to the EGM to start a game play session. Player loyalty points can also be tracked without the need for insertion of a player loyalty card into the EGM. Thus, with the pairing, the patron will not mistakenly leave a loyalty card in an EGM after he or she has left the EGM.

Figure 4:
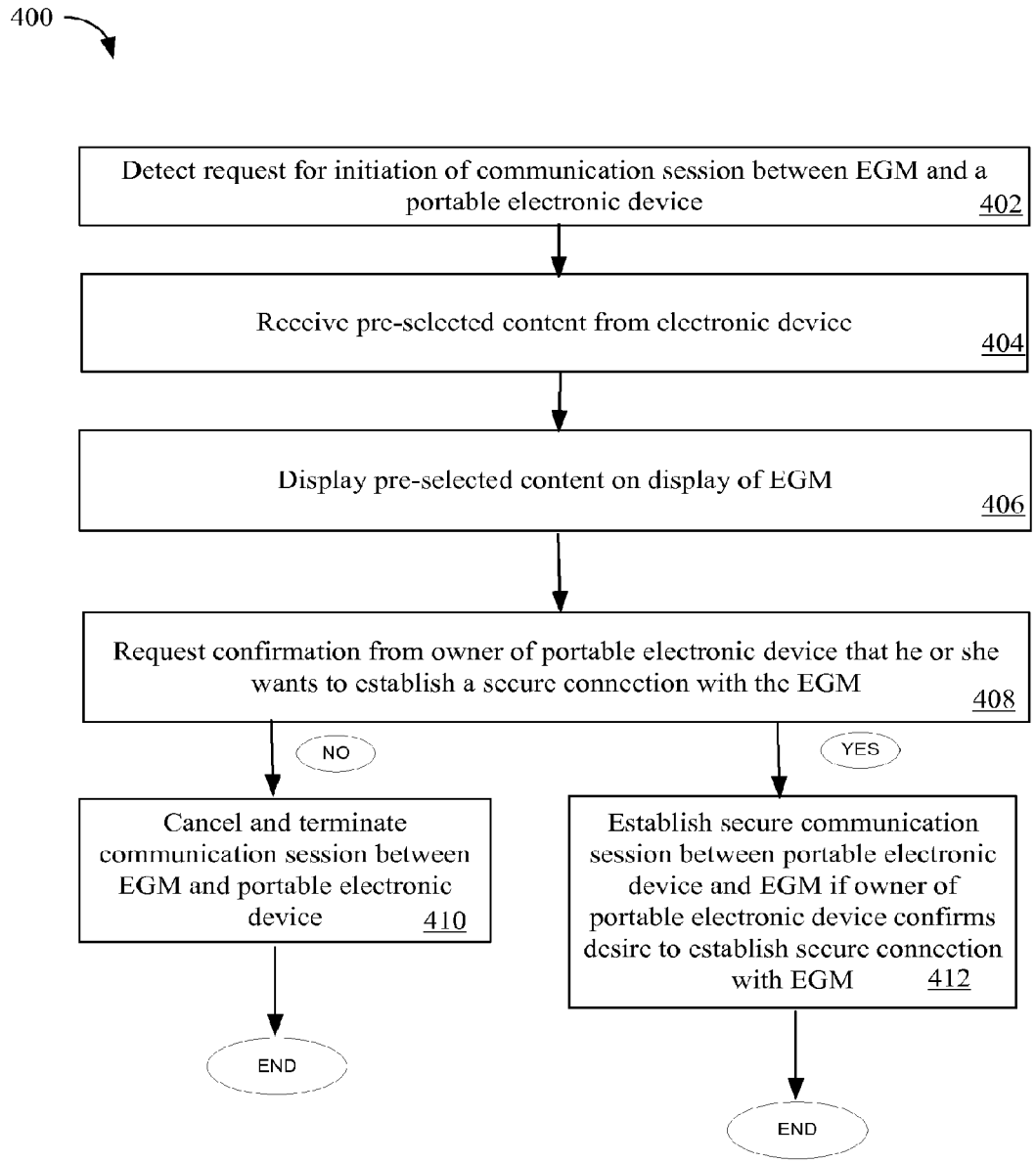
FIG. 4 is flow diagram of an embodiment of a method of confirming that a wireless communication session is secure between a portable electronic device and an EGM.

Next, with respect to FIG. 4, a method 400 of confirming that a wireless communication session is secure between a portable electronic device and an EGM is described. As described above, one or more of the steps in the method can also be performed by an application executing on an EGM or on a portable electronic device. In 402, a request for initiation of a communication session between an EGM and a portable electronic device can be detected.

In 404, pre-selected content can be received from the portable electronic device. This pre-selected content is displayed on an EGM display in 406. In 408, a request can be made for confirmation from the owner of the portable electronic device that he or she wants to establish a secure connection with the EGM. For example, a message requesting such confirmation can appear on the portable electronic device or on the EGM or both.

If the owner of the portable device indicates that he or she does not want to establish a secure connection with the EGM, the method moves on to 410 where the communication session between the EGM and the portable electronic device is canceled and terminate. If the owner of the portable electronic device confirms that he or she wants to establish a secure connection with the EGM, the method moves on to 412 where a secure communication session can be established between the portable electronic device and the EGM.

The determination of whether a communication session between a wireless mobile device and an EGM is secure involves the utilization of a wireless architecture. Thus, some details of a wireless architecture are described for the purpose of illustration. The EGMs and the servers can be configured to communicate via wireless communications with portable electronic devices. On the EGM, in one embodiment, wireless communications can be controlled by a game controller on the EGM. In other embodiments, a secondary controller on the EGM, such as a secondary controller in a player tracking unit, a card reader, a bill validator or a printer, can be used to control wireless communications as well as an attract feature involving a portable electronic device independently of the game controller. For example, a player tracking unit can include its own touch screen video display, audio device and wireless communication capabilities that allow it to pair with a portable electronic device and to implement an attract feature independently of the game controller.

In yet other embodiments, two or more different controllers can be used to implement wireless communications involving a portable electronic device. In one embodiment, a first controller, such as a player tracking controller, can handle wireless communications with the portable electronic device. The player tracking controller can forward the communications to a second controller, such as the game controller. In response, the game controller can wirelessly pair with a portable electronic device and/or implement an attract feature on the EGM and possibly communicate with the portable electronic device via the player tracking unit.

The wireless communications can be used to implement for various functions, including payment, player loyalty, and implementing attract features involving one or more EGMs and/or portable electronic devices. To enable wireless communications, all or a portion of the EGMs can each include one or more wireless transceivers. The EGMs can be configured to communicate using the wireless transceivers in a number of different communication protocols depending on the capabilities of the portable electronic device. For instance, communications protocols, such as Bluetooth™, Wi-Fi™ and Near-Field Communication (NFC) can be implemented on the EGMs. Further details of the capabilities of the EGMs are described with respect to FIGS. 5 and 6.

When implemented, devices implementing the protocols can have different communication ranges. For instance, a class 2 Bluetooth™ device has a range of about 10 meters or less while a low power class 3 Bluetooth™ device has a range of about 5 meters or less. NFC enabled devices can have a range of about 4 cm or less. Indoors, depending on the obstructions and the version of Wi-Fi that is implemented, the range of a Wi-Fi enabled device can be up to about 50 meters. A cellular communication range can be up to a few kilometers. The portable electronic devices described herein can be enabled to simultaneously implement multiple wireless communication protocols. Devices, such as EGMs, can be configured to detect and interpret wireless signals formatted in different protocols. As will be discussed in more detail below, the different ranges associated with each protocol can be used, at a first pass, to determine the approximate location of a wirelessly transmitting portable electronic device relative to a receiving device, such as an EGM.

In various embodiments, methods, such as triangulation, signal strength determination and signal analysis can be used to determine an approximate location of portable electronic device within a casino including relative distance of a portable electronic device to other devices within the casino, such as an EGM. A location determination can be performed by a server, such as 14 and 15 and/or an EGM to determine the locations of nearby portable electronic devices. Further, portable electronic devices can be provided with an application that allows it to determine its relative indoor position, such as a position within a casino. The application may utilize information furnished by a casino, such as a floor plan, and the location of wireless signal sources within the casino to determine its relative position within an indoor environment, such as a casino.

A number of wireless access points (not shown) can be provided in the area proximate to the banks of EGMs. As described in the previous paragraph, location information associated with the wireless access points can be provided to portable electronic device used within the casino. In one embodiment, via the wireless access points, a portable electronic device, such as 16, can communicate with a server, such as 14 and 15. In another embodiment, a portable electronic device may be able to communicate with a server, such as 14 and 15, through an intermediary device, for example via an EGM. Besides being used for portable device communication, via the wireless access points, an EGM, such as 10a, may also be to communicate with servers, such as 14 and 15.

In particular embodiments, a plurality of receivers can be located within the casino environment for receiving wireless communication signals, such as, for example, 1) the signals that cellular capable devices broadcast to cell phone towers, 2) the signals Wi-Fi™ enabled devices broadcast and 3) the signals Bluetooth™ enabled devices broadcast. In general, wireless signals can be formatted according to many different types of communication protocols. Thus, different receivers configured to receive one or more different types of wireless signals and associated devices that process the wireless signals according to an associated wireless communication protocol can be utilized.

In particular embodiments, wireless receivers of different types, i.e., configured to receive wireless signals in one or more different portions of the wireless spectrum can be incorporated into an EGM. A wireless receiver can be a separate component provided with the EGM or can be built in a device provided with the EGM, such as but not limited to a card reader, bill validator, a player tracking unit or a printer. In some instances, an EGM can include multiple wireless receivers. The data received from the various wireless receivers can be used in a method used to determine the location of a portable electronic device, such as a method involving signal triangulation.

As an example, the cellular data signals can be processed according to a cellular communication protocol, such as GSM or CDMA, to learn information about the device that is broadcasting the information, such as information that allows the cellular enabled device to be identified as a unique node in a cellular network. In one embodiment, one or more of the EGMs can include this capability, i.e., the ability to receive and process cellular data signals in a GSM or a CDMA format. Again, this information can also be utilized for device location and tracking purposes. Further, the information can be used for patron identification purposes if the player has registered unique device information, such as a phone number, with the casino enterprise.

In some instances, a single device can be configured to broadcast multiple wireless communication protocols simultaneously. According to such an embodiment, a wireless device tracking system can be configured to detect a single device in different wireless spectrums simultaneously and perform location estimations, such as triangulation, based on the signals broadcast in the different wireless spectrums. For instance, a single portable electronic device, such as a smart phone, can be configured to broadcast wireless signals in a cellular portion of the wireless spectrum and a Wi-Fi™ portion of the spectrum simultaneously.

A wireless device tracking system can be configured to determine two estimates of its location using each of the two different types of wireless signals that have been received. In one embodiment, the system can be configured to determine which of the two different location estimates is more accurate and select the one determined more accurate for use. In another embodiment, the system can be configured to determine a single location estimate based upon each of the two location estimates. For instance, the two location estimates can be averaged together to provide the single location estimate.

In one embodiment, wireless receivers separate from the EGMs can be distributed throughout a casino enterprise and can be used to detect the presence of portable electronic devices, such as 16 or 17, via their transmitted cellular signals or other types of transmitted radio signals. The wireless receivers can report their signal information to a server, such as 14 and 15. Based upon the information interpreted from the received wireless signals, an approximate position of the portable electronic device 16, 17 within the casino enterprise can be determined, such as a location on a casino floor. In particular, the position of portable electronic devices 16, 17 relative to particular EGMs can be estimated. In other words, the approximate distance between a particular portable electronic device 16, 17 and an EGM can be estimated. Over time, this process can be repeated, i.e., the wireless signal environment can be regularly sampled, such that a location history versus time for various portable electronic devices 16, 17 can be determined.

Based upon this positional information determined for the portable electronic devices, a system server can be configured to determine whether to initiate a wireless connection between one or more of the portable devices and one or more EGMs. In another embodiment, an EGM can be configured to utilize the positional information to initiate a wireless connection with a portable electronic device. In yet other embodiments, an EGM acting alone or in conjunction with other EGMs via peer-to-peer communications can be configured to detect a nearby portable electronic device and initiate a wireless connection with the portable electronic device independently of a system server. It will be understood that the devices described above can also trigger an attract feature in addition to initiating a wireless connection between devices.

As described above, the portable electronic device can be recognized as belonging to a particular patron. For instance, a patron that is a member of a loyalty program may have registered unique identification information about the device, such as a MAC address and/or a phone number, to a loyalty account with the casino enterprise. The loyalty account can store preference information about the patron, such as preferred activities and promotions. The system, which can include servers 14 and 15 and the EGMs, can be configured to determine whether a portable electronic device is associated with a particular patron and if so determine whether any preference information is known about the particular patron, such as preference information stored in the patron's loyalty account. If preference information is known, then this information can be used to initiate a wireless connection with the portable electronic device belonging to that patron and/or to generate an attract feature for the patron based upon his or her preferences, such as preferred game types, preferred game denominations, particular games within a game type (e.g., a particular game generated on a video slot machine or a particular game generated on a reel slot machine) or combinations thereof.

In yet another embodiment, an application running on a portable electronic device, such as 16 or 17, can be configured with user selectable parameters indicating preferences of the user, such as a game type (i.e., mechanical or video slot) and a particular game (i.e., a particular game or a game denomination). This information can be broadcast by the portable electronic device and received by system devices, such as a server 15 or an EGM 10a. Based upon these settings, a system server or an EGM may only establish a wireless communication session when an EGM is nearby that meets the selected criteria. For instance, if the patron has selected parameter(s) in the application that indicates his or her interest in large jackpot progressive games (i.e., jackpots above a threshold value of one million dollars or more), then a wireless communication link will only be established with an idle EGM nearby that provides this type of game play. As another example, if the patron has selected parameters in that application that indicates their interest in games of only a dollar denomination then a wireless communication session may not be established with EGMs that do not meet these criteria. As described above, this information can also be stored to the patron's loyalty account. However, using an application executing on the patron's portable electronic device can allow for patrons not registered in a loyalty program to express preferences that can affect whether a wireless communication link is established with that patron's device.

In other embodiments, an application on a patron's portable electronic device 16 can be configured to instruct a system server or an EGM to use game play history information stored on the portable electronic device or within the gaming system to specify parameters that affect the initiation of wireless connection. In particular, the application executing on the patron's portable electronic device can include a user selectable parameter that instructs an EGM or a system server to initiate a wireless connection based upon their game play history. As an example, a patron can select a parameter that instructs the system to initiate a wireless connection even if the patron is outside the normal range for connection. For example, if the normal range of the system for connection is 10 yards and if the patron's game play history information indicates that the patron likes a particular type of game and there is an EGM with such a game within 20 yards of the patron, the system can be configured to initiate a wireless connection with the portable electronic device 16 belonging to that patron even though the patron is outside the normal connection range. If the patron's device includes information about the patron's game play history, this information can be uploaded to the system and used in conjunction with user selectable parameters about the game play history to determine whether to initiate a wireless connection and/or to trigger an attract feature.

When the patron 22 approaches one of the EGMs and is within a predetermined range, a wireless communication link can be established between one of the EGMs and the patron's portable electronic device. In one embodiment, the predetermined range is a radius of about 10 yards around the EGM. In another embodiment, the predetermined range can be a radius of about 15 yards around the EGM. The system can be configured to set different predetermined ranges for particular EGMs and/or portable devices. The different predetermined ranges can be based on criteria, such as, for example, a patron's preferences, game play history of the portable electronic device, game play history of the EGM, an application on the patron's portable electronic device, as well as casino default ranges. Once the wireless communication link is established between the EGM and portable electronic device, a game play session can begin. In another embodiment, an attract feature, such as an offer, can be sent to the portable electronic device to encourage the patron to begin a game play session. The attract feature can be sent to the portable electronic device by either a server or the EGM itself.

If a nearby EGM is already occupied by a patron engaged in an active game play session, the system will not establish a new wireless communication link between that EGM and a portable electronic device 17 belonging to another patron nearby. The system can also be configured to add spacing between occupied EGMs and EGMs with which a wireless communication link can be established. For example, with EGMs 10d and 12j occupied, the system can be configured not to establish wireless communication with EGM 10c, 10e or 12i for patron 22 so as not to disturb patrons 20 and 24.

Figure 5:
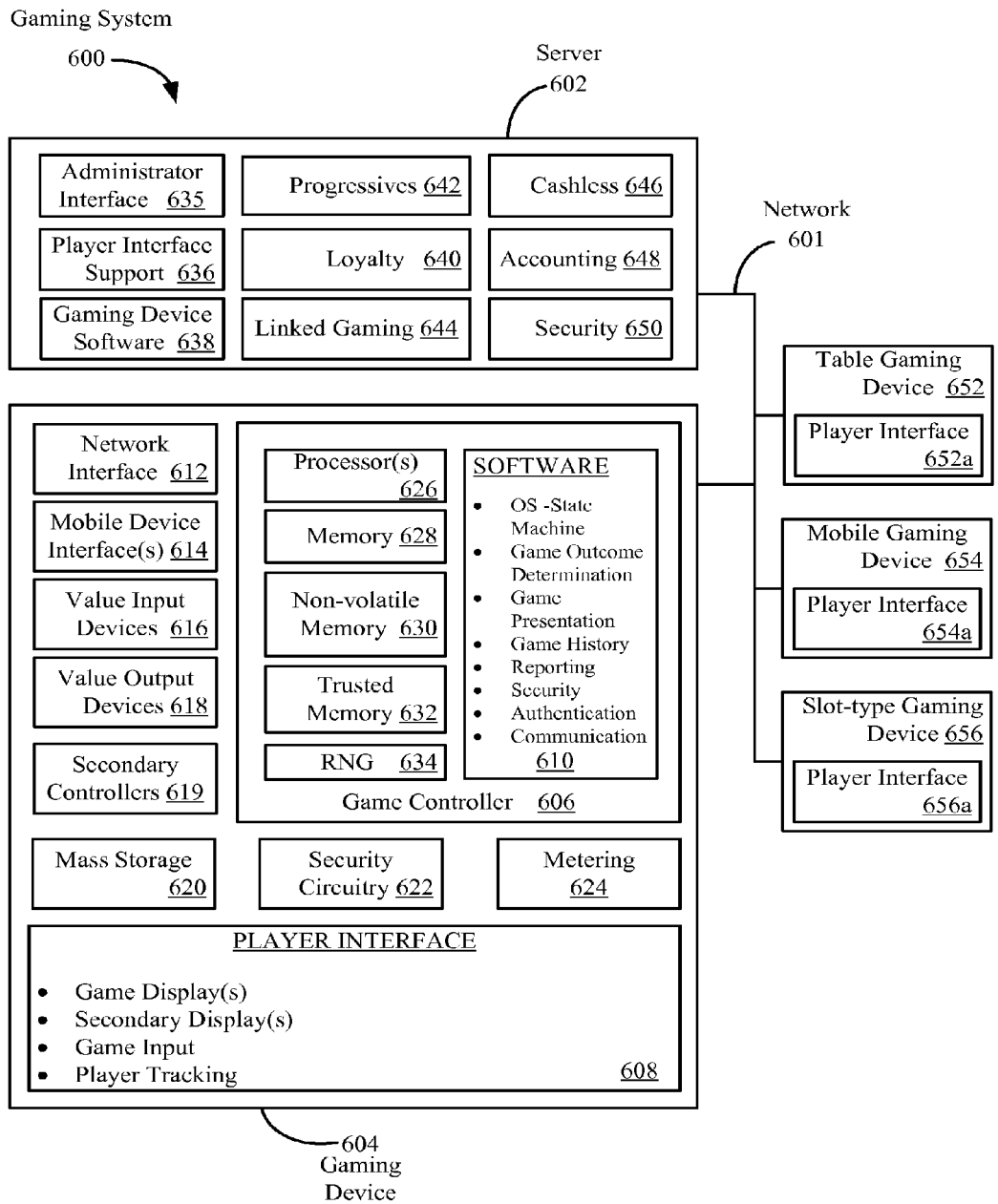
FIG. 5 shows a block diagram of a gaming system including a server and gaming devices in accordance with the described embodiments.

FIG. 5 shows a block diagram of a gaming system 600 in accordance with the described embodiments. The gaming system 600 can include one or more servers, such as server 602, and a variety of gaming devices including but not limited to table gaming devices, such as 652, mobile gaming devices, such as 654, and slot-type gaming devices, such as 656. The table gaming devices, such as 652, can include apparatus associated with table games where a live operator or a virtual operator is employed. The gaming devices and one or more servers can communicate with one another via a network 601. The network can include wired, wireless or a combination of wired and wireless communication connections and associated communication routers.

Some gaming devices, such as 652, 654 and 656, can be configured with a player interface that allows at least 1) selections, such as a wager amount, associated with a wager-based game to be made and 2) an outcome of the wager-based game to be displayed. As an example, gaming devices, 652, 654 and 656, include player interfaces, 652a, 654a and 656a, respectively. Typically, gaming devices with a player interface are located in publically accessible areas, such as a casino floor. On the other hand, some gaming devices, such as server 602, can be located in publically inaccessible areas, such is in a back-room of a casino or even off-site from the casino. Gaming devices located in publically inaccessible areas may not include a player interface. For instance, server 602 does not include a player interface. However, server 602 includes an administrator interface 635 that allows functions associated with the server 602 to be adjusted.

An example configuration of a gaming device is described with respect to gaming device 604. The gaming device 604 can include 1) a game controller 606 for controlling a wager-based game played on the gaming device and 2) a player interface 608 for receiving inputs associated with the wager-based game and for displaying an outcome to the wager-based game. In more detail, the game controller 606 can include a) one or more processors, such as 626, b) memory for holding software executed by the one or more processors, such as 628, c) a non-volatile memory, such as 630, d) one or more trusted memories, such as 632, e) a random number generator and f) a plurality of software applications, 610. The other gaming devices, including table gaming device 652, mobile gaming device 654, slot-type gaming device 656 and server 602, can each include a game controller with all or a portion of the components described with respect to game controller 606.

In particular embodiments, the gaming device can utilize a "state" machine architecture. In a "state" machine architecture critical information in each state is identified and queued for storage to a persistent memory. The architecture doesn't advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming device. Examples of critical information can include but are not limited to an outcome determined for a wager-based game, a wager amount made on the wager-based game, an award amount associated with the outcome, credits available on the gaming device and a deposit of credits to the gaming device.

The non-volatile memory 630 can be used as a persistent memory for critical data, such as critical data associated with maintaining a "state" machine on the gaming device. One characteristic of a non-volatile memory 630 is a fast data transfer time. According to some embodiments, the current state is kept in "persistent memory" (e.g. NVRAM, disk drive) so that in the event of a power failure, the EGM can recover to the proper state after power is restored.

In one embodiment, the gaming device 605 can be configured to detect power fluctuations and in response, trigger a transfer of critical data from RAM to the non-volatile memory 630. One example of a non-volatile memory 630 is a battery-backed RAM. The battery supplies power to the normally volatile RAM so that in the event of a power failure data is not lost. Thus, a battery-backed RAM is also often referred to as a non-volatile RAM or NV-RAM. An advantage of a battery-backed RAM is that the fast data transfer times associated with a volatile RAM can be obtained.

The trusted memory 632 is typically a read-only memory of some type that may be designed to be unalterable. An EPROM or EEPROM are two types of memory that can be used as a trusted memory 632. The gaming device 604 can include one or more trusted memories. Other types of memories, such as Flash memory, can also be utilized as an unalterable memory and the example of an EPROM or EEPROM is provided for purposes of illustration only.

Prior to installation the contents of a trusted memory, such as 632, can be verified. For instance, a unique identifier, such as a hash value, can be generated on the contents of the memory and then compared to an accepted hash value for the contents of the memory. The memory may not be installed if the generated and accepted hash values do not match. After installation, the gaming device can be configured to check the contents of the trusted memory. For instance, a unique identifier, such as a hash value, can be generated on contents of the trusted memory and compared to an expected value for the unique identifier. If the generated value of the unique identifier and the expected value of the unique identifier don't match, then an error condition can be generated on the gaming device 604. In one embodiment, the error condition can result in the gaming device entering a tilt state where game play is temporarily disabled on the gaming device.

Sometimes verification of software executed on the gaming device 604 can be performed by a regulatory body, such as a government agency. Often software used by a game controller, such as 606, can be highly regulated, where only software approved by a regulatory body is allowed to be executed by the game controller 606. In one embodiment, the trusted memory 632 can store authentication programs and/or authentication data for authenticating the contents of various memories on the gaming device 604. For instance, the trusted memory 632 can store an authentication program that can be used to verify the contents of a mass storage device, such as 620, which can include software executed by the game controller 606.

The random number generator (RNG) 634 can be used to generate random numbers that can be used to determine outcomes for a game of chance played on the gaming device. For instance, for a mechanical or video slot reel type of game, the RNG, in conjunction with a paytable that lists the possible outcomes for a game of chance and the associated awards for each outcome, can be used to generate random numbers for determining reel positions that display the randomly determined outcomes to the wager-based game. In other example, the RNG might be used to randomly select cards for a card game. Typically, as described above, the outcomes generated on a gaming device, such as 604, are considered critical data. Thus, generated outcomes can be stored to persistent memory, such as non-volatile memory 630 or mass storage 620.

Not all gaming devices may be configured to generate their own game outcomes and thus, may not use an RNG for this purpose. In some embodiments, game outcomes can be generated on a remote device, such as server 602, and then transmitted to the gaming device 604 where the outcome and an associated award can be displayed to the player via the player interface 608. For instance, outcomes to a slot-type game or a card game can be generated on server 602 and transmitted to the gaming device 604.

In other embodiments, the gaming device 604 can be used to play central determination games, such as bingo and lottery games. In a central determination game, a pool of game outcomes can be generated and then, particular game outcomes can be selected as needed (e.g., in response to a player requesting to play the central determination game) from the pool of previously generated outcomes. For instance, a pool of game outcomes for a central determination game can be generated and stored on server 602. Next, in response to a request to play the central determination game on gaming device 604, one of the outcomes from the pool can be downloaded to the gaming device 604. A game presentation including the downloaded outcome can be displayed on the gaming device 604.

In other embodiments, thin client type gaming devices, such as mobile gaming devices used to play wager-based video card or video slot games, may be configured to receive at least game outcomes from a remote device and not use an RNG to generate game outcomes locally. The game outcomes can be generated remotely in response to inputs made on the mobile device, such as an input indicating a wager amount and/or an input to initiate the game. This information can be sent from the mobile device to a remote device, such as from mobile gaming device 654 to server 602. After receiving the game outcome from the remote device, a game presentation for the game outcomes generated remotely can be generated and displayed on the mobile device. In some instances, the game presentation can also be generated remotely and then streamed for display to the mobile device.

The game controller 606 can be configured to utilize and execute many different types of software applications 610. Typically, the software applications utilized by the game controller 606 can be highly regulated and may undergo a lengthy approval process before a regulatory body allows the software applications to be utilized on a gaming device deployed in the field, such as in a casino. One type of software application the game controller can utilize is an Operating System (OS). The OS can allow various programs to be loaded for execution by the processor 626, such as programs for implementing a state machine on the gaming device 606. Further, the OS can be used to monitor resource utilization on the gaming device 606. For instance, certain applications, such as applications associated with game outcome generation and game presentation that are executed by the OS can be given higher priority to resources, such as the processor 626 and memory 628, than other applications that can be executing simultaneously on the gaming device.

As previously described, the gaming device 604 can execute software for determining the outcome of a wager-based game and generating a presentation of the determined game outcome including displaying an award for the game. As part of the game outcome presentation one or more of 1) electro-mechanical devices, such as reels or wheels, can be actuated, 2) video content can be output to video displays, 3) sounds can be output to audio devices, 4) haptic responses can be actuated on haptic devices or 5) combinations thereof, can be generated under control of the game controller 606. The peripheral devices used to generate components of the game outcome presentation can be associated with the player interface 608 where the types of devices that are utilized for the player interface 608 can vary from device to device.

To play a game, various inputs can be required. For instance, via input devices coupled to the gaming device 604, a wager amount can be specified, a game can be initiated or a selection of a game choice associated with the play of the game can be made. The software 610 executed by the game controller 606 can be configured to interpret various signals from the input devices, such as signals received from a touch screen controller or input buttons, and affect the game played on the gaming device in accordance with the received input signals. The input devices can also be part of the player interface 608 provided with the gaming device, such as 604.

In other embodiments, the gaming software 610 executed by the game controller 606 can include applications that allow a game history including the results of a number of past games to be stored, such as the previous 10 or 100 games played on the gaming device 604. The game history can be stored to a persistent memory including but not limited to the non-volatile memory 630. The gaming controller 606 can configured to provide a menu (typically, only operator accessible), that allows the results of a past game to be displayed via the player interface 608. The output from the history menu can include a re-creation of the game presentation associated with a past game outcome, such as a video representation of card hand associated with a video poker game, a video representation of a reel configuration associated with a video slot game, and/or raw data associated with the past game result, such as an award amount, an amount wagered, etc. The history menu can be used for dispute resolution purposes, such as if a player complains that they have not been properly awarded for a game previously played on the gaming device 604.

The reporting software can be used by the game controller 606 to report events that have occurred on the gaming device 604 to remote device, such as server 602. For instance, in one embodiment, the game controller 606 can be configured to report error conditions that have been detected on the gaming device 604, such as if a device has malfunctioned or needs attention. For instance, the reporting software can be used to send a message from the gaming device 604 to the server 602 indicating that a printer on the gaming device needs a refill of tickets. In another embodiment, the gaming controller 606 can be configured to report security events that may have occurred on the gaming device 604, such as but not limited to if a door is opened, a latch is activated or an interior portion of the gaming device 604 has been accessed.

In yet other embodiments, the game controller 606 can be configured to report gaming activity and associated events that has been generated on the gaming device, such as a deposit of cash or an indicia of credit, at the gaming device, a generation of game outcome including an associated award amount and a dispensation of cash or an indicia of credit from the gaming device 604. As part of a loyalty program, the gaming activity can be associated with a particular player. The reporting software can include player tracking elements that allow the gaming activity of a particular player to be reported to a remote device, such as server 602.

The game controller 606 can execute the authentication software to verify the authenticity of data and/or software programs executed on the gaming device 604. For instance, the authentication software can be used to verify the authenticity of data and/or software applications when they are first downloaded to the gaming device 604. Further, the authentication software can be used to periodically verify the authenticity of data and/or software applications currently residing on the gaming device, such as software applications stored on one of the memories coupled to the gaming device 604 including applications loaded into the memory 628 for execution by the processor 626.

The communication software executed by the game controller 606 can be used to communicate with a variety of devices remote to the gaming device 604. For instance, the communication software can be used to communicate with one or more of a) servers remote to the device, such as 602, b) other gaming devices, such as table gaming device 652, mobile gaming device 654 and slot-type gaming device 656 and c) mobile devices carried by casino personnel or players in the vicinity of the gaming device 604. Via the communication software, the game controller can be configured to communicate via many different communication protocols. For instance, different wireless and/or wired communication protocols can be implemented. Further, proprietary or non-proprietary gaming specific protocols can be implemented. For instance, gaming specific non-proprietary communication protocols, such as G2S (game to system), GDS (gaming device standard) and S2S (system to system) communication protocols provided by the Gaming Standards Association (GSA), Fremont, Calif., can be implemented on the gaming devices described herein.

The gaming device 604 can communicate with one or more remote devices via one or more network interfaces, such as 612. For instance, via network interfaces 612 and the network 601, the gaming device 604 can communicate with other gaming devices, such as server 602 and/or gaming devices, 652, 654 and 656. The network interfaces can provide wired or wireless communications pathways for the gaming device 604. Some gaming devices may not include a network interface or can be configured to operate in a stand-alone mode where the network interface is not connected to a network.

In other embodiments, a mobile device interface or interfaces, such as 614, can be provided for communicating with a mobile device, such as a cell phone or a tablet computer carried by players or casino personnel temporarily in the vicinity of the gaming device 604. A wireless communication protocol, such as Bluetooth™ and a Wi-Fi compatible standard, can be used for communicating with the mobile devices via the mobile device interfaces 614. In one embodiment, the mobile device interface can implement a short range communication protocol, such as a near-field communication (NFC) protocol used for mobile wallet applications. NFC is typically used for communication distances of 4 cm or less. In addition, a wired communication interface, such as a docking station, can be integrated into the gaming device, such as 604. The wired communication interface can be configured to provide communications between the gaming device 604 and the mobile device and/or providing power to the mobile device.

Near field communication, or NFC, allows for simplified transactions, data exchange, and connections with a touch. Formed in 2004, the Near Field Communication Forum (NFC Forum) promotes sharing, pairing, and transactions between NFC devices and develops and certifies device compliance with NFC standards. NFC's short range helps keep encrypted identity documents private. Thus, a smartphone or tablet with an NFC chip can make a credit card/debit card payment to a gaming device or serve as keycard or ID card for a loyalty program. Further, an NFC device can act a hotel room key. The user of an NFC device as a hotel room keys and/or a player tracking card instrument may allow fast VIP check-in and reduce staffing requirements.

NFC devices can read NFC tags on a gaming device 604 to get more information about the gaming device including an audio or video presentation. For instance, a tap of an NFC enabled device to a gaming device can be used to instantly share a contact, photo, song, application, video, or website link. In another example, an NFC enabled device can be used to transfer funds to the gaming device or enter the player in a multi-player tournament. As another example, an NFC enabled device can be used to receive information from a gaming device that can be used in a persistent gaming application or a social media application.

Further, NFC enabled signage can include NFC tags that allow a patron to learn more information about the content advertised in the signage. The NFC enabled signage can be part of a gaming system. For instance, a sign advertising a show available at the casino can be configured to transfer information about the show, show times and ticketing information via an NFC tag. As another example, a sign showing jackpot information, such as progressive jackpot information, can be used to transfer information about the jackpot, such as the last time the jackpot was won and where it was won.

In one embodiment, an NFC interface on a gaming device can be used to set-up a higher speed communication between the gaming device and another NFC enabled device such as smart phone. The higher speed communication rates can be used for expanded content sharing. For instance, a NFC and Bluetooth enabled gaming device can be tapped by an NFC and Bluetooth enabled smart phone for instant Bluetooth pairing between the devices. Instant Bluetooth pairing between a gaming device and an NFC enabled device, such as a smartphone, can save searching, waiting, and entering codes. In another example, a gaming device can be configured as an NFC enabled router, such as a router supporting a Wi-Fi communication standard. Tapping an NFC enabled device to an NFC enabled and Wi-Fi enabled gaming device can be used to establish a Wi-Fi connection between the two devices.

As an example, the NFC communication can be used to exchange information to allow pairing to be established between a user-controlled device and the gaming device 604. For instance, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol allows for a Wi-Fi device pair directly with another without having to first join a local network. The method makes it possible to share media from a phone, play multiplayer games or otherwise communicate directly, even when no router exists. Via pairing between the gaming device 604 and portable electronic device, a portable electronic device may be able to utilize some of the functionality of secondary devices residing on the gaming device 604. For instance, it may be possible for a player to print something from their portable electronic device using the printer on the gaming device 604 when it is paired to the gaming device 604.

The gaming device 604 can include one or more each of value input devices 616 and value output device 618. The value input devices 616 can be used to deposit cash or indicia of credit onto the gaming device. The cash or indicia of credit can be used to make wagers on games played on the gaming device 604. Examples of value input devices 616 include but are not limited to a magnetic-striped card or smart card reader, a bill and/or ticket acceptor, a network interface for downloading credits from a remote source, a wireless communication interface for reading credit data from nearby devices and a coin acceptor. A few examples of value input devices are shown in FIG. 5.

The value output devices can be used to dispense cash or indicia of credit from the gaming device 604. Typically, the indicia of credit can be exchanged for cash. For instance, the indicia of credit can be exchanged at a cashier station or at a redemption station. Examples of value output devices can include a network interface for transferring credits into a remote account, a wireless communication interface that can be used with a mobile device implementing mobile wallet application, a coin hopper for dispensing coins or tokens, a bill dispenser, a card writer, a printer for printing tickets or cards redeemable for cash or credits. Another type of value output device is a merchandise dispenser, which can be configured to dispense merchandise with a tangible value from a gaming device. A few examples of value output devices are shown in FIG. 5.

The combination of value input devices 616 and value output devices 618 can vary from device to device. In some embodiments, a gaming device 604 may not include a value input device or a value output device. For instance, a thin-client gaming device used in a mobile gaming application may not include a value input device and a value output device. Instead, a remote account can be used to maintain the credits won or lost from playing wager-based games via the mobile device. The mobile device can be used to access the account and affect the account balance via game play initiated on the mobile device. Credits can be deposited or withdrawn from the remote account via some mechanism other than via the mobile device interface.

In yet other embodiments, the gaming device 604 can include one or more secondary controllers 619. The secondary controllers can be associated with various peripheral devices coupled to the gaming device, such as the value input devices and value output devices described in the preceding paragraphs. As another example, the secondary controllers can be associated with peripheral devices associated with the player interface 608, such as input devices, video displays, electro-mechanical displays and a player tracking unit. In some embodiments, the secondary controllers can receive instructions and/or data from and provide responses to the game controller 606. The secondary controller can be configured to interpret the instructions and/or data from the game controller 606 and control a particular device according to the received instructions and/or data. For instance, a print controller may receive a print command with a number of parameters, such as a credit amount and in response print a ticket redeemable for the credit amount. In another example, a touch screen controller can detect touch inputs and send information to the game controller 606 characterizing the touch input.

In a particular embodiment, a secondary controller can be used to control a number of peripheral devices independently of the game controller 606. The game controller may or may not be able to provide control commands for these peripheral devices. For instance, a player tracking unit can include one or more of a video display, a touch screen, card reader, network interface, a wireless interface for communicating with a portable electronic device, a wireless receiver for detecting a portable electronic device or input buttons that are only configured to receive control commands from a player tracking controller and not the game controller. A secondary controller, such as a player tracking controller, can control these devices to provide player tracking services and bonusing on the gaming device 604. In alternate embodiments, the game controller 604 can control one or more of these devices to perform player tracking functions.

Other devices besides player tracking units, such as card readers, bill validators and printers which are utilized on a gaming device 604, can also include secondary controllers that can be used to perform functions independently of a game controller. In particular embodiments, a secondary controller on one of these devices can be used to initiate a wireless communication session involving a portable electronic device, as described above. For instance, a player tracking unit may be able to detect a portable electronic device and initiate a wireless communication session the portable electronic device.

In yet other embodiments, a secondary controller and the game controller 606 can share one or more devices on the gaming device. For instance, the secondary controller at times may be able to utilize a portion of the video display that used by the game controller to output a game of chance. Logic can be provided that arbitrates which controller is allowed to control a particular shared device at a particular time. The arbitration can depend on the current state of the gaming device. Thus, in some instances depending on the current state of the gaming device, a first controller, such as a game controller, can be given control over a shared device while in other instances, a secondary controller, such as a player tracking controller, can be given control over a shared device.

An advantage of performing player tracking functions via a secondary controller, such as a player tracking controller, is that since the player tracking functions do not involve controlling the wager-based game, the software on the player tracking unit can be developed modified via a less lengthy and regulatory intensive process than is required for software executed by the game controller 606, which does control the wager-based game. In general, using a secondary controller, certain functions of the gaming device 604 that are not subject to as much regulatory scrutiny as the game play functions can be decoupled from the game controller 606 and implemented on the secondary controller instead. An advantage of this approach, like for the player tracking controller, is that software approval process for the software executed by the secondary controller can be less intensive than the process needed to get software approved for the game controller. Thus, in particular embodiments, it may be advantageous to provide the software involving wireless communications with portable electronic devices in a secondary controller.

A mass storage unit(s) 620, such as a device including a hard drive, optical disk drive, flash memory or some other memory storage technology can be used to store applications and data used and/or generated by the gaming device 604. For instance, a mass storage unit, such as 620, can be used to store gaming applications executed by the game controller 606 where the gaming device 604 can be configured to receive downloads of game applications from remote devices, such as server 602. In one embodiment, the game controller 606 can include its own dedicated mass storage unit. In another embodiment, critical data, such as game history data stored in the non-volatile memory 630 can be moved from the non-volatile memory 630 to the mass storage unit 620 at periodic intervals for archival purposes and to free up space in the non-volatile memory 630.

The gaming device 604 can include security circuitry 622, such as security sensors and circuitry for monitoring the sensors. The security circuitry 622 can be configured to operate while the gaming device is receiving direct power and operational to provide game play as well as when the gaming device is uncoupled from direct power, such as during shipping or in the event of a power failure. The gaming device 604 can be equipped with one or more secure enclosures, which can include locks for limiting access to the enclosures. One or more sensors can be located within the secure enclosures or coupled to the locks. The sensors can be configured to generate signals that can be used to determine whether secure enclosures have been accessed, locks have been actuated or the gaming device 604, such as a mobile device has been moved to an unauthorized area. The security monitoring circuitry can be configured to generate, store and/or transmit error events when the security events, such as accessing the interior of the gaming device, have occurred. The error events may cause the game controller 606 to place itself in a "safe" mode where no game play is allowed until the error event is cleared.

The server 602 can be configured to provide one or more functions to gaming devices or other servers in a gaming system 600. The server 602 is shown performing a number of different functions. However, in various embodiments, the functions can be divided among multiple servers where each server can communicate with a different combination of gaming devices. For instance, player interface support 636 and gaming device software 638 can be provided on a first server, progressives can be provided on a second server, loyalty program functions 640 and accounting 648 can be provided on a third server, linked gaming 644 can be provided on a fourth server, cashless functions 646 can be provided on a fifth server and security functions 650 can be provided on a sixth server. In this example, each server can communicate with a different combination of gaming devices because each of the functions provided by the servers may not be provided to every gaming device in the gaming system 600. For instance, the server 602 can be configured to provide progressive gaming functions to gaming devices 604, 652 and 656 but not gaming device 654. Thus, the server 602 may not communicate with the mobile gaming device 654 if progressive functions are not enabled on the mobile gaming device at a particular time.

Typically, each server can include an administrator interface that allows the functions of a server, such as 602, to be configured and maintained. Each server 602 can include a processor and memory. In some embodiments, the servers, such as 602, can include a game controller with components, such as but not limited to a non-volatile memory 630, a trusted memory 632 and an RNG 634 described with respect to gaming device 604. The servers can include one or more network interfaces on which wired or wireless communication protocols can be implemented. Next, some possible functions provided by the server 602 are described. These functions are described for the purposes of illustration only and are not meant to be limiting.

The player interface support 636 can be used to serve content to gaming devices, such as 604, 652, 654 and 656, remote to the server. The content can include video and audio content that can be output on one of the player interfaces, such as 608, 652*a*, 654*a* and 656*a*. Further, the content can be configured to utilize unique features of a particular player interface, such as video displays, wheels or reels, if the particular player interface is so equipped.

In one embodiment, via the player interface support, content can be output to all or a portion of a primary video display that is used to output wager-based game outcomes on a player interface associated with a gaming device. For instance, a portion of the primary display can be allocated to providing a "service window" on the primary video display where the content in the service window is provided from a server remote to the gaming device. In particular embodiments, the content delivered from the server to a gaming device as part of the player interface support 636 can be affected by inputs made on the gaming device. For instance, the service window can be generated on a touch screen display where inputs received via the service window can be sent back to server 602. In response, to the received inputs, the server 602 can adjust the content that is displayed on the remote gaming device that generated the inputs.

The "service window" application can be generated by software code that is executed independently of other game controller software in a secure "sandbox." Via the sandbox, an executable can be given limited access to various resources on an EGM, such as a portion of the CPU resources and memory available on a game controller. The memory can be isolated from the memory used by other processes, such as game processes executed by the game controller.

As described above, a service window application can be allowed to control, send and/or receive data from secondary devices on a gaming device, such as a video display, a touch screen power interfaces or communication interfaces. A service window application allowed to utilize a communication interface, such as a wireless communication interface, can be configured to communicate with a portable electronic device via the communication interface independently of a game controller on an EGM. Further details of utilizing a service window on a gaming device on an EGM are described in U.S. patent application Ser. No. 12/209,608, by Weber et al., filed Sep. 12, 2008, titled "Gaming Machine with Externally Controlled Content Display," which is hereby incorporated herein by reference in its entirety and for all purposes.

In another embodiment, via the video display, the service window application can be configured to output data in an optical image format, such as a 1-D/2-D bar-code or a QR code. The optically formatted data can be captured by a camera on the portable electronic device. For instance, information about a promotion can be displayed in the service window in a QR code format and transferred to a user's portable electronic device via an image capture device on their portable electronic device.

If a player's identity is known, then the player interface support 636 can be used to provide custom content to a remote gaming device, such as 604. For instance, a player can provide identification information, such as information indicating their membership in a loyalty program, during their utilization of a gaming device. The custom content can be selected to meet the identified player's interests. In one embodiment, the player's identity and interests can be managed via a loyalty program, such as via a loyalty program account associated with loyalty function 640. The custom content can include notifications, advertising and specific offers that are determined to be likely of interest to a particular player.

The gaming device software function 638 can be used to provide downloads of software for the game controller and/or second controllers associated with peripheral devices on a gaming device. For instance, the gaming device software 638 may allow an operator and/or a player to select a new game for play on a gaming device. In response to the game selection, the gaming device software function 638 can be used to download game software that allows a game controller to generate the selected game. In another example, in response to determining that a new counterfeit bill is being accepted by bill acceptors in the gaming system 600, the gaming device software function 638 can be used to download a new detection algorithm to the bill acceptors that allow the counterfeit bill to be detected.

The progressive gaming function 642 can be used to implement progressive game play on one or more gaming devices. In progressive game play, a portion of wagers associated with the play of a progressive game is allocated to a progressive jackpot. A group of gaming devices can be configured to support play of the progressive game and contribute to the progressive jackpot. In various embodiments, the gaming devices contributing to a progressive jackpot may be a group of gaming devices collocated near one another, such as a bank of gaming machines on a casino floor, a group of gaming devices distributed throughout a single casino, or group of gaming devices distributed throughout multiple casinos (e.g., a wide area progressive). The progressive gaming function 642 can be used to receive the jackpot contributions from each of the gaming devices participating in the progressive game, determine a current jackpot and notify participating gaming devices of the current progressive jackpot amount, which can be displayed on the participating gaming devices if desired.

The loyalty function 640 can be used to implement a loyalty program within a casino enterprise. The loyalty function 640 can be used to receive information regarding activities within a casino enterprise including gaming and non-gaming activities and associate the activities with particular individuals. The particular individuals can be known or may be anonymous. The loyalty function 640 can used to store a record of the activities associated with the particular individuals as well as preferences of the individuals if known. Based upon the information stored with the loyalty function 640 comps (e.g., free or discounted services including game play), promotions and custom contents can be served to the particular individuals.

The linked gaming function 644 can be used to used provide game play activities involving player participating as a group via multiple gaming devices. An example, a group of player might be competing against one another as part of a slot tournament. In another example, a group of players might be working together in attempt to win a bonus that can be shared among the players.

The cashless function 646 can enable the redemption and the dispensation of cashless instruments on a gaming device. For instance, via the cashless function, printed tickets, serving as a cashless instrument, can be used to transfer credits from one gaming device to another gaming device. Further, the printed tickets can be redeemed for cash. The cashless function can be used to generate identifying information that can be stored to a cashless instrument, such as a printed ticket, that allows the instrument to later be authenticated. After authentication, the cashless instrument can be used for additional game play or redeemed for cash.

The accounting function can receive transactional information from various gaming devices within the gaming system 600. The transactional information can relate to value deposited on each gaming device and value dispensed from each gaming device. The transactional information, which can be received in real-time, can be used to assess the performance of each gaming device as well as an overall performance of the gaming system. Further, the transactional information can be used for tax and auditing purposes.

The security function 650 can be used to combat fraud and crime in a casino enterprise. The security function 650 can be configured to receive notification of a security event that has occurred on a gaming device, such as an attempt at illegal access. Further, the security function 650 can receive transactional data that can be used to identify if gaming devices are being utilized in a fraudulent or unauthorized manner. The security function 650 can be configured to receive, store and analyze data from multiple sources including detection apparatus located on a gaming device and detection apparatus, such as cameras, distributed throughout a casino. In response to detecting a security event, the security function 650 can be configured to notify casino personnel of the event. For instance, if a security event is detected at a gaming device, a security department can be notified. Depending on the security event, one or more team members of the security department can be dispatched to the vicinity of the gaming device. Next, a perspective diagram of a slot-type gaming device that can include all or a portion of the components described with respect to gaming device 604 is described.

FIG. 5 shows a perspective drawing of a gaming device 700 in accordance with the described embodiments. The gaming device 700 is example of what can be considered a "thick-client." Typically, a thick-client is configurable to communicate with one or more remote servers but provides game play, such as game outcome determination, independent of the remote servers. In addition, a thick-client can be considered as such because it includes cash handling capabilities, such as peripheral devices for receiving cash, and a secure enclosure within the device for storing the received cash. In contrast, thin-client device, such as a mobile gaming device, may be more dependent on a remote server to provide a component of the game play on the device, such as game outcome determination, and/or may not include peripheral devices for receiving cash and an associated enclosure for storing it.

Many different configurations are possible between thick and thin clients. For instance, a thick-client device, such as 700, deployed in a central determination configuration, may receive game outcomes from a remote server but still provide cash handling capabilities. Further, the peripheral devices can vary from gaming device to gaming device. For instance, the gaming device 700 can be configured with electro-mechanical reels to display a game outcome instead of a video display, such as 710. Thus, the features of gaming device 700 are described for the purposes of illustration only and are not meant to be limiting.

The gaming device 700 can include a main cabinet 702. The main cabinet 702 can provide a secure enclosure that prevents tampering with the device components, such as a game controller (not shown) located within the interior of the main cabinet and cash handing devices including a coin acceptor 720, a ticket printer 726 and a bill acceptor 718. The main cabinet can include an access mechanism, such as door 704, which allows an interior of the gaming device 700 to be accessed. The actuation of the door 704 can be controlled by a locking mechanism, such as lock 716. The lock 716, the door 704 and the interior of the main cabinet 702 can be monitored with security sensors for detecting whether the interior has been accessed. For instance, a light sensor can be provided to detect a change in light-level in response to the door 704 being opened.

The interior of the main cabinet 700 can include additional secure enclosure, which can also be fitted with locking mechanisms. For instance, the game controller, such as game controller 606, shown in FIG. 5, can be secured within a separate locked enclosure. The separate locked enclosure for the game controller may allow maintenance functions to be performed on the gaming device, such as emptying a drop box for coins, emptying a cash box or replacing a device, while preventing tampering with the game controller. Further, in the case of device with a coin acceptor, 720, the separate enclosure can protect the electronics of the game controller from potentially damaging coin dust.

Figure 6:
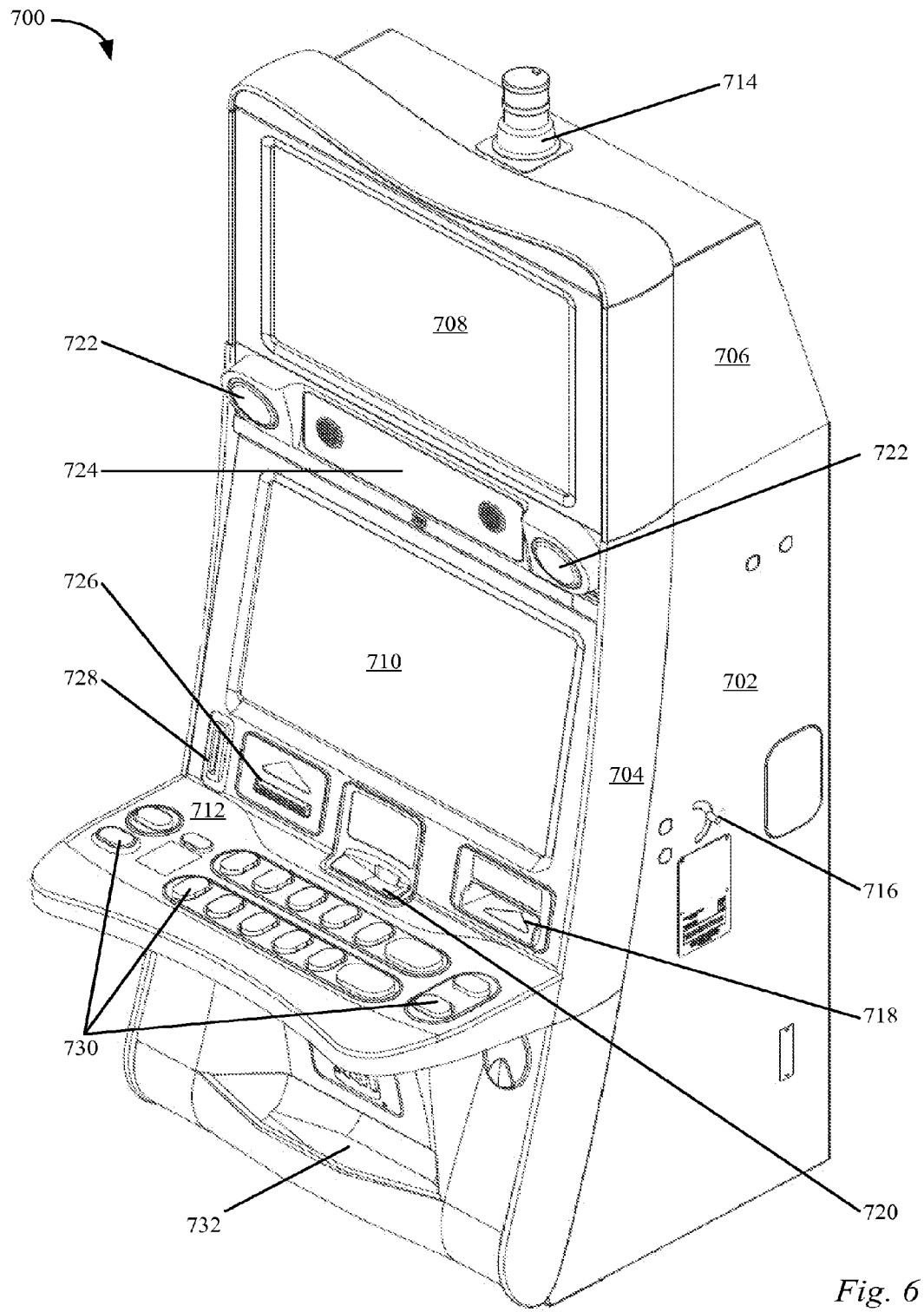
FIG. 6 shows a perspective drawing of a gaming device in accordance with the described embodiments.

A top box 706 can be mounted to the top of the main cabinet 702. A number of peripheral devices can be coupled to the top box 706. In FIG. 6, a display device 708 and a candle device 714 are mounted to the top box 706. The display device 708 can be used to display information associated with game play on the gaming device 700. For instance, the display device 708 can be used to display a bonus game presentation associated with the play of a wager-based game (One or more bonus games are often features of many wager-based games). In another example, the display device 708 can be used to display information associated with a progressive game, such as one or more progressive jackpot amounts. In yet another example, the display device 708 can be used to display an attract feature that is intended to draw a potential player's attention to the gaming device 700 when it is not in use.

The candle device 714 can include a number of lighting elements. The lighting elements can be lit in different patterns to draw attention to the gaming device. For instance, one lighting pattern may indicate that service is needed at the gaming device 700 while another light pattern may indicate that a player has requested a drink. The candle device 714 is typically placed at the top of gaming device 700 to increase its visibility. Other peripheral devices, including custom bonus devices, such as reels or wheels, can be included in a top box 706 and the example in FIG. 6 is provided for illustrative purposes only. For instance, some of the devices coupled to the main cabinet 702, such as printer 726, can be located in a different top box configuration.

The gaming device 700 provides a player interface that allows the play of a game, such as wager-based game. In this embodiment, the player interface includes 1) a primary video display 710 for outputting video images associated with the game play, 2) audio devices, such as 722, for outputting audio content associated with game play and possibly casino operations, 3) an input panel 712 for at least providing game play related inputs and 4) a secondary video display 708 for outputting video content related to the game play (e.g., bonus material) and/or the casino enterprise (e.g., advertising). In particular embodiments, one or both of the video displays, 708 and 710, can be equipped with a touch screen sensor and associated touch screen controller, for detecting touch inputs, such as touch inputs associated with the play of a game or a service window output to the display device.

The input panel 712 can include a number of electromechanical input buttons, such as 730, and/or touch sensitive surfaces. For instance, the input panel can include a touch screen equipped video display to provide a touch sensitive surface. In some embodiments, the functions of the electro-mechanical input buttons can be dynamically reconfigurable. For instance, the function of the electro-mechanical input buttons may be changed depending on the game that is being played on the gaming device. To indicate function changes, the input buttons can each include a configurable display, such as an e-ink or a video display for indicating the function of button. The output of the configurable display can be adjusted to account for a change in the function of the button.

The gaming device 700 includes a card reader 728, a printer 726, a coin acceptor 720, a bill and/or ticket acceptor 720 and a coin hopper (not shown) for dispensing coins to a coin tray 732. These devices can provide value input/output capabilities on the gaming device 700. For instance, the printer 726 can be used to print out tickets redeemable for cash or additional game play. The tickets generated by printer 726 as well as printers on other gaming devices can be inserted into bill and ticket acceptor 718 to possibly add credits to the gaming device 700. After the ticket is authenticated, credits associated with the ticket can be transferred to the gaming device 700.

The device 718 can also be used to accept cash bills. After the cash bill is authenticated, it can be converted to credits on the gaming device and used for wager-based game play. The coin acceptor 720 can be configured to accept coins that are legal tender or tokens, such as tokens issued by a casino enterprise. A coin hopper (not shown) can be used to dispense coins that are legal tender or tokens into the coin tray 732.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, optical media (e.g., CD-ROMs, DVDs), magnetic tape, solid state drives (e.g., flash drives) and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

This invention is claimed as follows:

1. A method comprising:
   receiving, from a first portable electronic device including a touch screen and a processor, a communication request signal for a designated activity;
   receiving, from the first portable electronic device, displayable person-selected security content accessible through the first portable electronic device, the displayable person-selected security content including real time information provided by the first portable electronic device, said displayable person-selected security content including a visually displayable representation; and
   causing a second electronic device to display the displayable person-selected security content to confirm to a person that a designated level of security exists between the first portable electronic device and the second electronic device in relation to the designated activity, wherein the designated activity occurs during a period of time while the first portable electronic device and the second electronic device are in a substantially same proximity to each other.

2. The method of claim 1, wherein the displayable person-selected security content includes real time video.

3. The method of claim 1, wherein the displayable person-selected security content includes real time motion information.

4. The method of claim 1, which includes continuously displaying the displayable person-selected security content on the display of the second electronic device until a designated event occurs.

5. The method of claim 1, wherein the designated activity includes a communication session between the first portable electronic device and the second electronic device.

6. The method of claim 1, wherein the displayable person-selected security content is directly received by the second electronic device from the first portable electronic device.

7. The method of claim 1, which includes causing a transfer of monetary value associated with the designated activity.

8. The method of claim 1, which includes causing payment information to be transferred from the first portable electronic device to the second electronic device.

9. The method of claim 1, which includes causing electronic voucher information to be transferred from the first portable electronic device to the second electronic device.

10. The method of claim 1, which includes causing an electronic fund transfer from the first portable electronic device to the second electronic device.

11. The method of claim 1, which includes causing player tracking information to be transferred from the first portable electronic device to the second electronic device.

12. The method of claim 1, wherein the second electronic device is an electronic gaming machine.

13. A method comprising:
    receiving, from a first portable electronic device including a touch screen and a processor, a communication request signal for a designated activity;
    receiving, from the first portable electronic device, displayable selected security content accessible through the first portable electronic device, the displayable selected security content including real time information provided by the first portable electronic device, said displayable selected security content including a visually displayable representation;
    causing an electronic gaming device to display the displayable selected security content to confirm to a person that a designated level of security exists between the first portable electronic device and the electronic gaming device in relation to the designated activity, wherein the designated activity occurs during a period of time while the first portable electronic device and the electronic gaming device are in a substantially same proximity to each other; and
    causing one of:
    (a) a transfer of monetary value associated with the designated activity;
    (b) payment information to be transferred from the first portable electronic device to the electronic gaming device;
    (c) electronic voucher information to be transferred from the first portable electronic device to the electronic gaming device;
    (d) an electronic fund transfer from the first portable electronic device to the electronic gaming device; and
    (e) player tracking information to be transferred from the first portable electronic device to the electronic gaming device.

14. The method of claim 13, wherein the displayable selected security content includes displayable person-selected security content.

15. The method of claim 13, wherein the displayable selected security content includes real time video.

16. The method of claim 13, wherein the displayable selected security content includes real time motion information.

17. The method of claim 13, which includes continuously displaying the displayable selected security content on the display of the electronic gaming device until a designated event occurs.

18. The method of claim 13, wherein the designated activity includes a communication session between the first portable electronic device and the electronic gaming device.

19. The method of claim 13, wherein the displayable selected security content is directly received by the electronic gaming device from the first portable electronic device.

20. A method comprising:
   receiving, from a first portable electronic device including a touch screen and a processor, a communication request signal for a designated activity;
   receiving, from the first portable electronic device, displayable selected security content accessible through the first portable electronic device, the displayable selected security content including real time information provided by the first portable electronic device, said displayable selected security content including a visually displayable representation including real time video; and
   causing a second electronic device to display the displayable selected security content to confirm to a person that a designated level of security exists between the first portable electronic device and the second electronic device in relation to the designated activity, wherein the designated activity occurs during a period of time while the first portable electronic device and the second electronic device are in a substantially same proximity to each other.

21. A method comprising:
   receiving, from a first portable electronic device including a touch screen and a processor, a communication request signal for a designated activity;
   receiving, from the first portable electronic device, displayable selected security content accessible through the first portable electronic device, the displayable selected security content including real time motion information provided by the first portable electronic device, said displayable selected security content including a visually displayable representation; and
   causing a second electronic device to display the displayable selected security content to confirm to a person that a designated level of security exists between the first portable electronic device and the second electronic device in relation to the designated activity, wherein the designated activity occurs during a period of time while the first portable electronic device and the second electronic device are in a substantially same proximity to each other.

22. A method comprising:
   receiving, from a first portable electronic device including a touch screen and a processor, a communication request signal for a designated activity;
   receiving, from the first portable electronic device, displayable selected security content accessible through the first portable electronic device, the displayable selected security content including real time information provided by the first portable electronic device, said displayable selected security content including a visually displayable representation; and
   causing a second electronic device to continuously display, until a designated event occurs, the displayable selected security content to confirm to a person that a designated level of security exists between the first portable electronic device and the second electronic device in relation to the designated activity, wherein the designated activity occurs during a period of time while the first portable electronic device and the second electronic device are in a substantially same proximity to each other.

23. A method comprising:
   receiving, from a first portable electronic device including a touch screen and a processor, a communication request signal for a designated activity;
   receiving, from the first portable electronic device, displayable selected security content accessible through the first portable electronic device, the displayable selected security content including real time information provided by the first portable electronic device, said displayable selected security content including a visually displayable representation;
   causing a second electronic device to display the displayable selected security content to confirm to a person that a designated level of security exists between the first portable electronic device and the second electronic device in relation to the designated activity, wherein the designated activity occurs during a period of time while the first portable electronic device and the second electronic device are in a substantially same proximity to each other; and
   causing a transfer of monetary value associated with the designated activity.

24. A method comprising:
   receiving, from a first portable electronic device including a touch screen and a processor, a communication request signal for a designated activity;
   receiving, from the first portable electronic device, displayable selected security content accessible through the first portable electronic device, the displayable selected security content including real time information provided by the first portable electronic device, said displayable selected security content including a visually displayable representation;
   causing a second electronic device to display the displayable selected security content to confirm to a person that a designated level of security exists between the first portable electronic device and the second electronic device in relation to the designated activity, wherein the designated activity occurs during a period of time while the first portable electronic device and the second electronic device are in a substantially same proximity to each other; and
   causing payment information to be transferred from the first portable electronic device to the second electronic device.

25. A method comprising:
   receiving, from a first portable electronic device including a touch screen and a processor, a communication request signal for a designated activity;
   receiving, from the first portable electronic device, displayable selected security content accessible through the first portable electronic device, the displayable selected security content including real time information provided by the first portable electronic device, said displayable selected security content including a visually displayable representation;
   causing a second electronic device to display the displayable selected security content to confirm to a person that a designated level of security exists between the first portable electronic device and the second electronic device in relation to the designated activity, wherein the designated activity occurs during a period of time while the first portable electronic device and the second electronic device are in a substantially same proximity to each other; and causing electronic voucher information to be transferred from the first portable electronic device to the second electronic device.

26. A method comprising:

receiving, from a first portable electronic device including a touch screen and a processor, a communication request signal for a designated activity;

receiving, from the first portable electronic device, displayable selected security content accessible through the first portable electronic device, the displayable selected security content including real time information provided by the first portable electronic device, said displayable selected security content including a visually displayable representation;

causing a second electronic device to display the displayable selected security content to confirm to a person that a designated level of security exists between the first portable electronic device and the second electronic device in relation to the designated activity, wherein the designated activity occurs during a period of time while the first portable electronic device and the second electronic device are in a substantially same proximity to each other; and causing an electronic fund transfer from the first portable electronic device to the second electronic device.

27. A method comprising:

receiving, from a first portable electronic device including a touch screen and a processor, a communication request signal for a designated activity;

receiving, from the first portable electronic device, displayable selected security content accessible through the first portable electronic device, the displayable selected security content including real time information provided by the first portable electronic device, said displayable selected security content including a visually displayable representation;

causing a second electronic device to display the displayable selected security content to confirm to a person that a designated level of security exists between the first portable electronic device and the second electronic device in relation to the designated activity, wherein the designated activity occurs during a period of time while the first portable electronic device and the second electronic device are in a substantially same proximity to each other; and causing player tracking information to be transferred from the first portable electronic device to the second electronic device.

* * * * *